PREPARATION OF STEAM CRACKED NAPHTHA FOR BENZENE RECOVERY

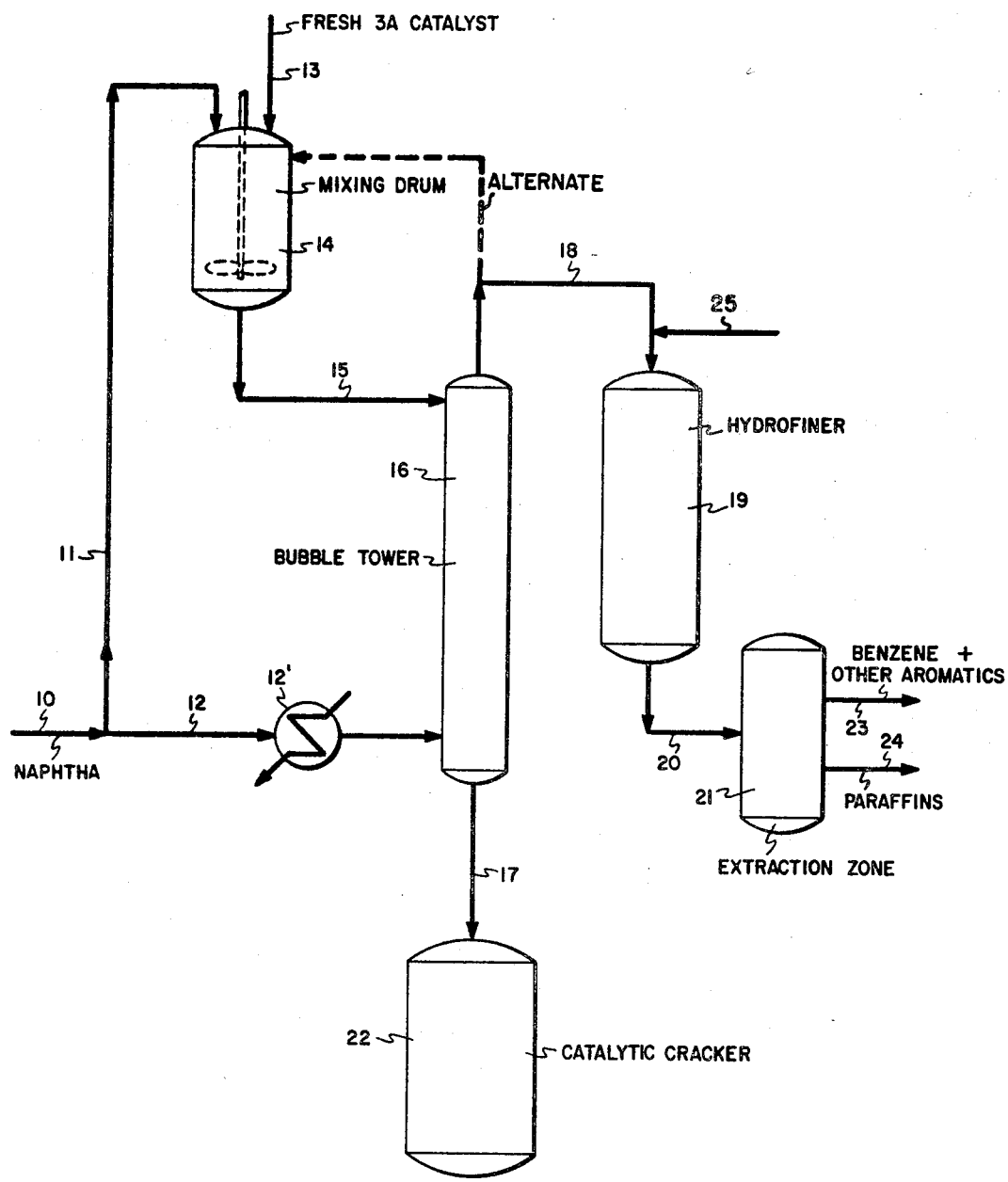

Jackson Eng and Sydney H. J. Greenwood, Sarnia, Ontario, Canada, assignors to Esso Research and Engineering Company, a corporation of Delaware
Filed Jan. 20, 1964, Ser. No. 338,692
4 Claims. (Cl. 260—674)

This invention relates to a process for reducing the olefin, diolefin and thiophene level of a steam cracked naphtha so that hydrofining of the steam cracked naphtha may take place without rapid deactivation of the hydrofining catalyst and following the hydrofining, pure benzene and other aromatics may be recovered from the hydrofined steam cracked naphtha by conventional means.

Heretofore, the hydrofining of steam cracked naphtha and conversion of the naphtha to a satisfactory extraction feed such as a feed for the Udex process has presented great difficulties. High olefin and diolefin content in the steam cracked naphtha products constantly deactivated in the hydrofiner catalyst. Attempts have been made in the past to remove these mono and diolefins from a steam cracked naphtha by means of clay absorbents. However, these attempts have involved extremely high costs since any clay absorbent utilized for absorption of mono and diolefins would have to be recovered and this could not be easily accomplished. Furthermore, these absorbents did not remove thiophenes which render solvent extraction processes, i.e. the Udex extraction, incapable of effective operation.

Hydrofining is necessary before a Udex extraction because of the limitations in the selectivity of the Udex process. Paraffins are easily separated from the aromatics, but separation of olefins and thiophenes from aromatics is not effective. Particular trouble is encountered with the thiophenes which traditionally have been virtually impossible to separate from aromatics in a solvent extraction process such as the Udex process. The removal of thiophenes by hydrofining is accomplished as follows:

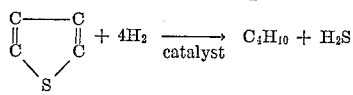

The thiophene is converted to a paraffin which may be separated from aromatics and particularly benzene by a Udex extraction.

According to this invention, a steam cracked naphtha and a slurry are contacted within a tower zone. The slurry is composed of steam cracked naphtha and a silica alumina catalytic cracking catalyst. The catalyst serves to polymerize almost all of the diolefins within the steam cracked naphtha and at least a portion of the monoolefins within the steam cracked naphtha are also polymerized. After being contacted with the slurry, the naphtha is removed from the tower and is subsequently hydrofined. Since the monoolefins and diolefins have been removed at least in part, the hydrofiner shows far less tendency to become deactivated. The silica alumina catalyst and polymer are removed from the tower and passed into a catalytic cracking zone. Within the catalytic cracking zone, the polymer is converted to fuel and the silica alumina catalyst serves its traditional function as a catalytic cracking catalyst. In this manner, no separate recovery step for a clay absorbent is needed. The catalyst is consumed as makeup to a catalytic cracker. Furthermore, the polymer is recovered in the catalytic cracker in the form of gasoline and middle distillate.

More particularly, a steam cracked naphtha is hydrofined economically and efficiently and thereby converted to a satisfactory solvent extraction feed, i.e. a Udex feed, so that substantially pure benzene may be recovered.

A silica alumina catalytic cracking catalyst is utilized in this process. The catalyst may contain 13–30% of alumina and 70–87% silica. A preferred catalyst is the catalyst designated a 3A which contains 87% silica and 13% alumina. The catalyst is used in the form of pellets which are 20–80 microns in size. Sufficient catalyst is mixed with steam cracked naphtha feed to form a slurry at ambient conditions. The slurry is charged to the top part of a conventional bubble tower. Near the bottom of the tower, heated steam cracked naphtha having a high monoolefin and diolefin content is introduced. As the naphtha is vaporized up through the tower, it is contacted with the descending silica alumina catalyst slurry. In this treatment, substantially all the diolefins and part of the monoolefins are polymerized. As a result, the contacted naphtha is sufficiently stable so that it can be hydrofined to less than 5 bromine number without rapid fouling of the catalyst.

The silica alumina catalytic cracking catalyst and polymer from the bottom of the bubble tower are sent to a catalytic cracker where the silica alumina catalyst comprises part of the usual catalyst makeup and the polymer is cracked to gasoline. The treated naphtha with included benzene concentrate is passed into a catalytic hydrofining unit. Within the hydrofiner, thiophenes are converted to butane and the remaining olefins are saturated. Hydrofined product is then passed to a solvent extraction zone, most preferably a Udex zone from whence benzene is recovered along with other aromatics. The hydrofining catalyst continues to operate effectively for a long period since substantially all of the diolefins and at least a portion of the monoolefins which have served to deactivate the catalyst in the past, have been removed. Due to the effective hydrofining of the naphtha, the benzene to be recovered is free of olefins and thiophenes.

The attached drawing is a diagrammatic representation of a preferred embodiment of this invention.

The reference numeral 10 refers to a line through which raw steam cracked naphtha is introduced into the system. The steam cracked naphtha has a bromine number of about 80–140 and a diene number of about 15–30. Its ASTM distillation range is approximately 90–430° F. Sulfur content range from 0.03 to 0.1 wt. percent.

The feedstock then is directed to two different channels, one channel being line 11 and the other line 12. The feed in line 11 passes through the said line into a conventional mixing drum 14. Fresh 3A catalyst (a c commercially available catalyst which comprises 87% silica and 13% alumina) is also introduced into the mixing drum. The catalyst is in the form of particles which are 20–80 microns in size. It should be noted that any silica alumina catalytic cracking catalyst containing 13–30% alumina and 70–87% silica may be used. The catalyst is introduced into the drum through line 13 amounting to about 1 pound of catalyst for every gallon of untreated or treated steam cracked naphtha introduced into the mixing drum, this amount is equivalent to a treating ratio in the tower of about 1 to 25 pounds of catalyst per barrel of total naphtha.

The naphtha and catalyst are mixed together within the drum for a period of about 2 to 30 minutes at ambient temperatures and pressure to form a slurry of catalyst and naphtha. The slurry is removed from the bottom of the drum 14 through line 15 and passed into the upper region of bubble tower 16. Raw steam cracked naphtha in line 12 passes through boiler 12' wherein the naphtha is vaporized and heated to a temperature of 400–800° F. and thereafter introduced into the bottom of bubble tower 16. The naphtha and catalyst slurry in the top of the tower slowly descend while the vapors in the bottom of the bubble tower 16 slowly ascend. The catalyst slurry and vapor are intimately contacted within the bubble tower. In this way, substantially all of the diolefins and part of the monoolefins present within the naphtha are polymerized. The polymerized material has a boiling range above that of the steam cracked naphtha and more particularly of the aromatics and benzene portions.

The silica alumina 3A catalyst and the newly formed polymer are withdrawn from the bottom of bubble tower 16 through line 17 and passed to a line 17 leading to catalytic cracker 22 where the 3A silica alumina catalyst forms part of the usual catalyst makeup of the catalytic cracker and is so utilized therein. Within the catalytic cracker, the polymer which is the result of the polymerization of the diolefins and monoolefins of the naphtha feed is cracked and thereby upgraded to gasoline and middle distillate fuels.

The contacted naphtha is removed from the top of bubble tower 16 through line 18. This naphtha has been treated with the 3A silica alumina catalyst and, consequently, is far different in characteristics from the feed which originally entered the bubble tower. The naphtha now has a bromine number of 50–80 and the diene number is no higher than 5. The treated naphtha flows through line 18 and into hydrofiner 19. Within hydrofiner 19 is a solid catalyst consisting of cobalt oxide and molybdenum oxide either as a mixture or contained as cobalt molybdate on a solid absorbent carrier which may be absorbent alumina, bauxite or any of a variety of well-known carriers employed for this general purpose. The catalyst generally contains about 2–5 wt. percent cobalt oxide and 8–15 wt. percent molybdenum oxide with about 3–5 wt. percent cobalt oxide and 12.5 wt. percent molybdenum oxide being particularly effective.

Temperatures within the hydrofiner may be in the range of 400–700° F., preferably a temperature of about 600° F. is utilized. Pressures of 200–2000 p.s.i.g. may be utilized. A preferred pressure would be in the range of 500–1000 p.s.i.g. Feed rate would vary between 0.5 and 5 v./v./hr.; $H_2$ treat would be about 200–3000 s.c.f./b. and $H_2$ consumption would be between 10 and 1000 s.c.f./b. $H_2$ is added through line 25.

Hydrofining removes undesirable sulfur, especially thiophenes, from hydrocarbons. Furthermore, and of particular importance in this case, monolefins and the very small amount of diolefin compounds that were not removed by the 3A contacting step are saturated by the hydrogen added to the system. This results in the formation of a motor fuel of improved octane number. The hydrofined product is removed from hydrofiner 19 through line 20. This hydrofined product has a bromine number of below 5 and a diene number of below 1 indicating that diolefins are essentially all removed from the system and monoolefins have been substantially reduced. The hydrofined product after being stripped free of hydrogen sulphide, is then passed through line 20 and into a solvent extraction zone 21 which may be a Udex extraction zone wherein aromatics and particularly benzene are removed from the hydrofined product. The Udex process is a selective liquid-liquid solvent extraction with separation and purification of aromatics from hydrocarbons. The basis to the Udex process is the fact that aqueous diethylene glycol solvent exhibits a selectivity roughly proportional to the carbon-hydrogen ratios of the feed components and adversely proportional to their boiling points. Solvent selectivity and solubility changes slowly with temperature and can be varied as required for different feedstocks by adjusting the water content which is usually 8–10%. Adjustment of the solvent/hydrocarbon feed ratio allows control of extraction efficiency with higher boiling aromatic fractions requiring the greater proportion of solvent. The hydrofined feed from line 20 is fed to an intermediate point in an extraction column within the Udex zone which contains contacting trays of novel design developed especially for this service. Clean solvent is fed to the top of the column and hydrocarbon reflux at the bottom. The rich solvent from the base of the extractor is taken to a stripper wherein the reflux and dissolved aromatics are separated from the solvent, the reflux being recirculated to the base of the extraction column. Reflux to the extractor has the function of displacing heavy paraffins in the rich solvent so that the dissolved aromatics are of high purity. The vapor streams from the stripper are condensed and separated into two phases, the water phases from both receivers being combined and returned to the base of the stripper. As the raffinate and extract streams both contain traces of dissolved glycols, they are washed with water in small columns. The aromatic product stream from the stripper, which extract is of high purity with respect to nonaromatic hydrocarbons, is then passed to a distillation zone in order to recover individual aromatics which boil off at their respective and well-known boiling points. Benzene and other aromatics are removed from the Udex extraction zone through line 23. Separation of benzene from the other aromatics would be obvious to one skilled in the art and need not be further discussed. Paraffins are removed through line 24.

EXAMPLES

TABLE I.—3A TREATMENT OF STEAM CRACKED NAPHTHA

| | I | II |
|---|---|---|
| Treatment | Nil | 10 lb. 3A Catalyst/ B Fresh Feed [1] |
| Total Naphtha or Product: | | |
| Gravity, ° API | 38.6 | 36.0 |
| Bromine No | 99 | 70 |
| Diene No | 20 | 5 |
| Distribution, LV, percent: | | |
| IBP/140° F | 20.8 | 18.7 |
| 140/200° F | 29.3 | 26.9 |
| 200/400° F | 42.1 | 40.3 |
| 400° F.+ | 7.8 | 14.1 |
| $C_5$/400° F. Fraction: | | |
| Gravity, ° API | 41.5 | 40.5 |
| Bromine No | 106 | 67 |
| Diene No | 26 | 6 |
| Total Sulfur, p.p.m | 431 | 412 |
| 140/200° F. Fraction: | | |
| Gravity, ° API | 39.4 | 36.8 |
| Bromine No | 68 | 44 |
| Diene No | 18 | 4 |
| Total Sulfur, p.p.m | 501 | 472 |

[1] Countercurrent treatment simulated by distilling a naphtha 3A slurry (1 liter/10 g.) in a lab fractionating column packed with 3A catalyst (20 g.) interspaced between wire mesh packing. Conditions are atmospheric pressure, 450° F. bottom column temperature.

Table I illustrates the effect of contacting the raw steam cracked naphtha with catalytic cracking catalyst. The countercurrent contact was simulated in the lab by distilling a steam cracked naphtha and 3A slurry through column 16. The column 16 was packed with 20 grams of catalyst and was about 30 inches long. The naphtha 3A slurry contained 1 liter of naphtha for every 10 grams of catalyst. The tower was maintained at atmospheric pressure. The temperature at the bottom of the column was about 450° F.

As a result of this contact, the diene number was lowered to 5 from 20 in the total naphtha and the bromine number was lowered to 20 from 99.

This reduction in diene and bromine number will extend the catalyst life in the hydrofiner.

In actual practice, an overhead naphtha fraction and a bottom polymer fraction were obtained. The overhead naphtha fraction has a nominal $C_5$/400° F. boiling range. As Table I illustrates, the bromine number of this fraction was reduced from 106 to 67 and diene number from 26 to 6. This reduction in bromine and diene numbers will considerably extend the catalyst life in the succeeding hydrofining step.

If it is desired to recover only benzene, it may be advantageous to hydrofine only the 140/200° F. fraction from the 3A treatment. The data show that 3A treatment markedly improved the quality; bromine number was reduced from 68 to 44 and diene number from 18 to 4.

TABLE II.—TREATING OF STEAM CRACKED PRODUCTS DURING CATALYTIC CRACKING

| | Steam Cracker Product | | | |
|---|---|---|---|---|
| | 490° F. Plus Polymer From Catalytic Treatment | | Total Polymer From Catalytic Treatment | |
| | Feed Type in Steam Cracker Operation | | | |
| | Gas—Oil | | Naphtha (C$_5$, 300° F.) | |
| | Bromine No. | Diene No. | Bromine No. | Diene No. |
| Inspections, Product Added: | | | | |
| Init., 430° F | | | 155 | 29 |
| 430–650° F | 73 | 13 | 67 | 21 |
| Percent Added to Feed to Lab. Cat. Cracking Unit, wt. percent | | 15 | | 15 |

| | Composition Of The Polymer Stream Added To the Gas-Oil Feed to Cat. Cracking | Yields Attributed to the Polymer Stream | Composition Of The Polymer Stream Added To the Gas-Oil Stream to Cat. Cracking | Yields Attributable To Polymer Stream |
|---|---|---|---|---|
| Yields, wt. percent: | | | | |
| C$_4$, 430° F | | 27.7 ⎫ 82.2 | 44.3 | 30.2 ⎫ 87.6 |
| 430–650° F | 30.2 | 54.5 ⎭ | 50.5 | 57.4 ⎭ |
| 650° F. Plus | 69.8 | 0.3 | 5.2 | 3.1 |
| Coke | | 7.9 | | 7.8 |
| Gas | | 9.6 | | 1.5 |

| Quality Total Product | Reference Run | Combined Operation | Combined Operation |
|---|---|---|---|
| Gasoline Fraction Bromine No | 95 | 21 | 113 |
| i-275° F. Fraction Diene No | 3.8 | 2.9 | 4.9 |
| 275° F. + Fraction Diene No | 3.8 | 2.5 | 3.3 |
| Gas-Oil Fraction Bromine No | 3.0 | 4.3 | 3.6 |
| 650° F. Plus Fraction: | | | |
| Viscosity SSU at 100° F | 81 | 101 | 83 |
| MNI | 0.2 | 0.6 | 0.4 |

This Table II presents data on catalytic cracking a polymer separated from the catalyst used for treating products from a gas-oil steam cracker and a polymer obtained from treating products obtained from steam cracking naphtha. In both cases, the polymer was intermixed with standard gas-oil feed to an amount of 15 wt. percent. The cracking experiments were carried out in a laboratory Fluid Catalytic Cracking unit. The laboratory fluid catalytic cracking conditions were: temperature of 965° F., total pressure of 0.5 p.s.i.g. and catalyst-to-oil ratio by weight of 3:1. However, conventional commercial fluid catalytic cracking conditions would be similarly effective.

In Table II the "Total Polymer From Catalytic Treatment" includes polymer obtained from the polymer bottoms fractions together with substantial amounts of gasoline fractions due to inefficient fractionation. The 490° F. polymer refers to separate testing of the polymer alone without the gasoline fractions.

From Table II it is apparent that inclusion of the polymer streams or the polymer of 3A treating would cause little or no effect on the qualities of catalytically cracked products and at the same time offer the advantage or recovery, as useful products, gasoline and gas-oil with no need of separate facilities or handling.

TABLE III.—CoMo HYDROFINING STEAM CRACKED NAPHTHA

| | Case | |
|---|---|---|
| | I | II |
| Feed (3A Treated) Fraction | C$_5$/400° F. | 140/200° F. |
| Hydrofined Product: | | |
| Gravity, °API | 43.0 | 38.8 |
| Bromine No | 2.1 | 0.5 |
| Diene No | 0.2 | Nil |
| Benzene, LV percent | 19 | 61 |
| Total Sulfur, p.p.m | 4 | 2 |
| Thiophene, p.p.m | 1 | 2.5 |

Table III sets out the results of hydrofining the 3A treated naphtha with a cobalt molybdate catalyst. The cobalt molybdate catalyst is one of the conventional metal oxide-type hydrogenation catalysts. It contains cobalt oxide and molybdenum oxide dispersed upon an alumina support. Such catalysts are prepared by the addition of cobalt nitrate and ammonium molybdate to alumina and with sufficient water to form a paste. After drying and grinding and pelletizing, catalyst pellets are obtained containing 5 to 25 wt. percent cobalt oxide and molybdenum oxide with the ratio of the former to the latter in the range from about 1/5 to 5/1. Hydrofining conditions were as follows: temperature of 550° F., pressure of 500 p.s.i.g., feed rate of 0.5 v./v./hr., hydrogen was added at the rate of 3000 s.c.f. H$_2$/B of fresh feed, product recycle was 2:1.

With either feed, the olefin content is reduced considerably below the 5 bromine number target required for suitable Udex feed. There was no apparent loss in hydrofining activity over an operating period of 1435 hours.

TABLE IV.—QUALITY OF BENZENE RECOVERED FROM HYDROFINED STEAM CRACKED NAPHTHA BY UDEX EXTRACTION

| | Benzene Product | ASTM Specification for Nitration Grade |
|---|---|---|
| LV Percent Yield on Total Naphtha Feed | 12 | |
| Specific Gravity, 60° F./60° F | 0.8838 | 0.8820–0.8860 |
| Sulfur, p.p.m | 1 | |
| Bromine No | <0.5 | |
| Diene No | <0.1 | |
| Benzene, LV percent | >99.5 | |
| Thiophene, p.p.m | 4.1 | (¹) |
| Freezing point, °C | 5.2 | >4.85 |
| Acid Wash Color | 1 | <2 |
| Acidity | (²) | (²) |
| Copper Corrosion | (³) | (³) |

¹ No limit indicated; generally <10 p.p.m. thiophene is acceptable.
² Nil.
³ Pass.

This table indicates the quality of benzene recovered from the hydrofined steam cracked naphtha by Udex extracting. Conventional Udex operating conditions were employed. Typical values were: triethylene glycol/feed ratio of 6 v./v. solvent water content of 5%, extraction temperature of 250° F. and reflux/feed ratio of about 1.2 v./v. As illustrated by the table the standards of nitration grade benzene are amply met, particularly with respect to thiophenes which were well below 10 p.p.m. Benzene yield was 12 LV percent on total naphtha feed. This corresponded to about 97% benzene recovery from feed.

It is understood that this invention is not limited to the specific examples which have been offered merely as illustrations and that modification may be made without departing from the spirit of the invention.

What is claimed is:
1. Process for treating a benzene containing steam cracked naphtha feedstock, the said steam cracked naphtha containing monoolefins, diolefins and thiophenes which comprises introducing said steam cracked naphtha into one end of a tower zone, the said tower zone having two ends, introducing a slurry of said steam cracked naphtha and a silica alumina catalytic cracking catalyst into the other end of said tower zone, countercurrently contacting the said steam cracked naphtha and the said slurry thereby polymerizing substantially all of the said diolefins and at least a portion of the said monoolefins, removing the contacted naphtha from one end of the said tower zone, removing silica alumina catalyst and polymer from the other end of said tower zone, passing said polymer and silica alumina catalyst into a catalytic cracking zone, said catalyst serving as makeup catalyst in said cracking zone, passing said contacted naphtha to a catalytic hydrofining zone whereby the said contacted naphtha is hydrofined and the said thiophenes converted to butane, passing the said hydrofined naphtha to a solvent extraction zone whereby a high percentage of said benzene is recovered.

2. Process of claim 1 where the said hydrofining takes place over a cobalt molybdate catalyst.

3. A process for treating steam cracked naphtha containing monoolefins, diolefins and thiophenes comprising the steps of:

(1) mixing a portion of said naphtha with a silica alumina cracking catalyst to form a slurry, (2) passing said slurry downwardly through a tower zone, (3) passing the remainder of said naphtha in vapor phase upwardly through said zone, whereby substantially all of the diolefins and at least a portion of said monoolefins are polymerized, (4) passing the polymer formed in Step 3 and the silica alumina cracking catalyst to a catalytic cracking zone, (5) cracking said polymer into gasoline and middle distillate fuels, (6) passing polymer-free naphtha from Step 3 to a catalytic hydrofining zone, (7) hydrofining the polymer-free naphtha whereby thiophenes are removed, and (8) recovering a steam cracked naphtha fraction of substantially reduced monoolefin, diolefin and thiophene content.

4. Process according to claim 3 in which said hydrofining step is carried out in the present of a cobalt molybdate catalyst at a temperature in the range of 400–700° F., a pressure in the range of 200–2000 p.s.i.g. and a hydrogen treat rate of 200–3000 s.c.f./b.

References Cited

UNITED STATES PATENTS

| 2,407,817 | 9/1946 | Danner | 208—88 |
| 2,087,455 | 7/1937 | Stratford | 208—260 |
| 2,534,025 | 12/1950 | Howes et al. | 208—143 |
| 2,744,942 | 5/1956 | Wankat | 206—674 |
| 2,799,627 | 7/1957 | Haensel | 260—674 |

FOREIGN PATENTS 345,738  4/1931  Great Britain.

DELBERT E. GANTZ, *Primary Examiner.*

C. E. SPRESSER, *Assistant Examiner.*